(No Model.) 2 Sheets—Sheet 1.
W. T. S. DICKEY.
POULTRY COOP.
No. 553,902. Patented Feb. 4, 1896.
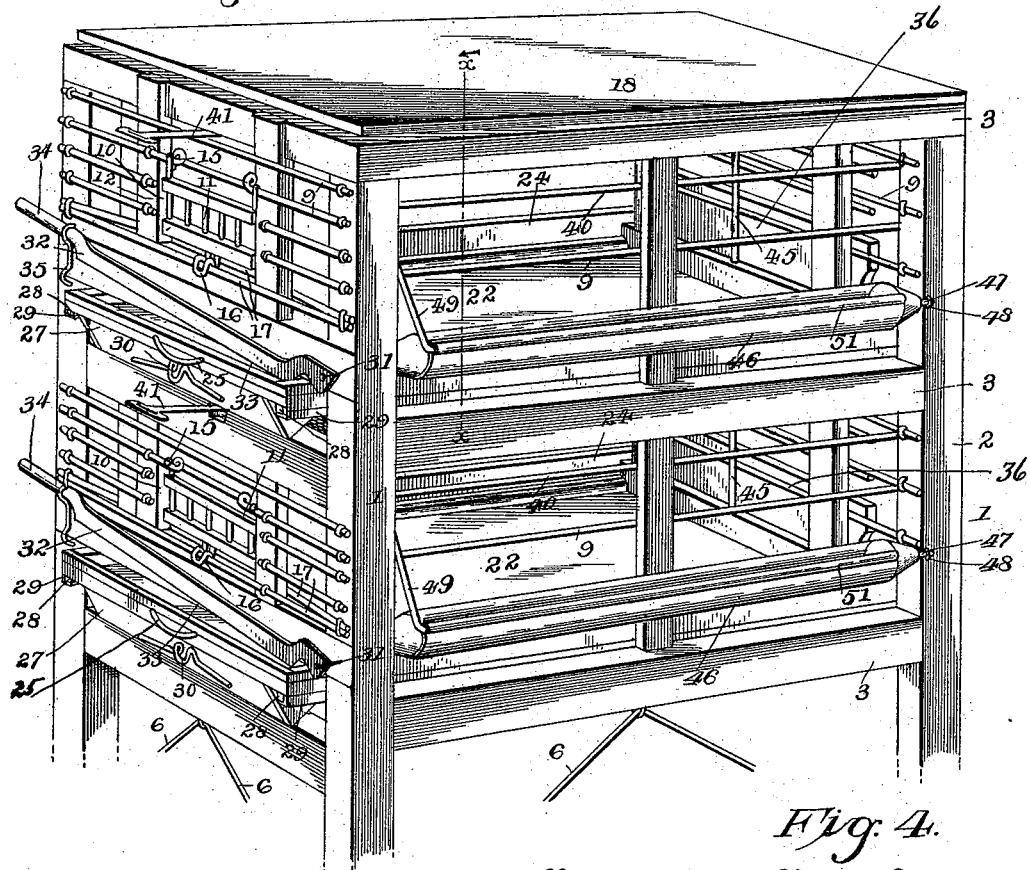
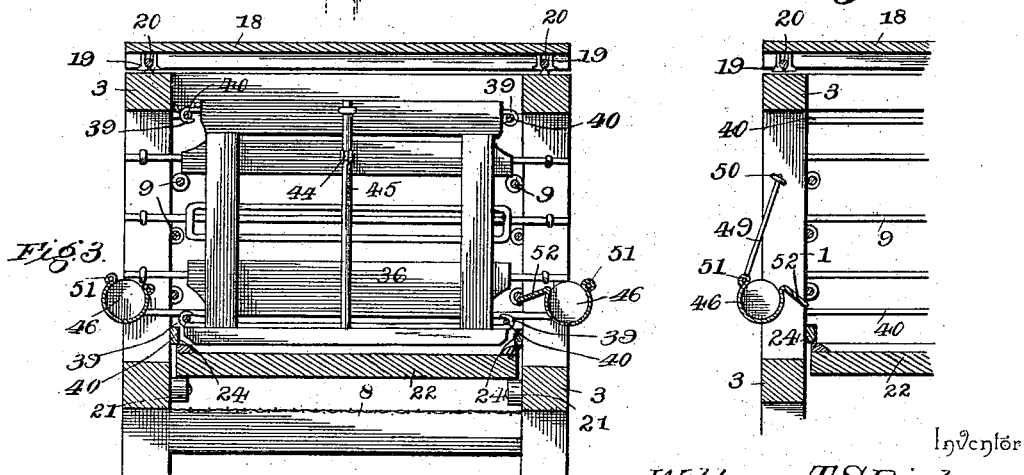
Witnesses
By his Attorneys.
Inventor
William T. S. Dickey
C. A. Snow & Co.

(No Model.) 2 Sheets—Sheet 2.
W. T. S. DICKEY.
POULTRY COOP.
No. 553,902. Patented Feb. 4, 1896.
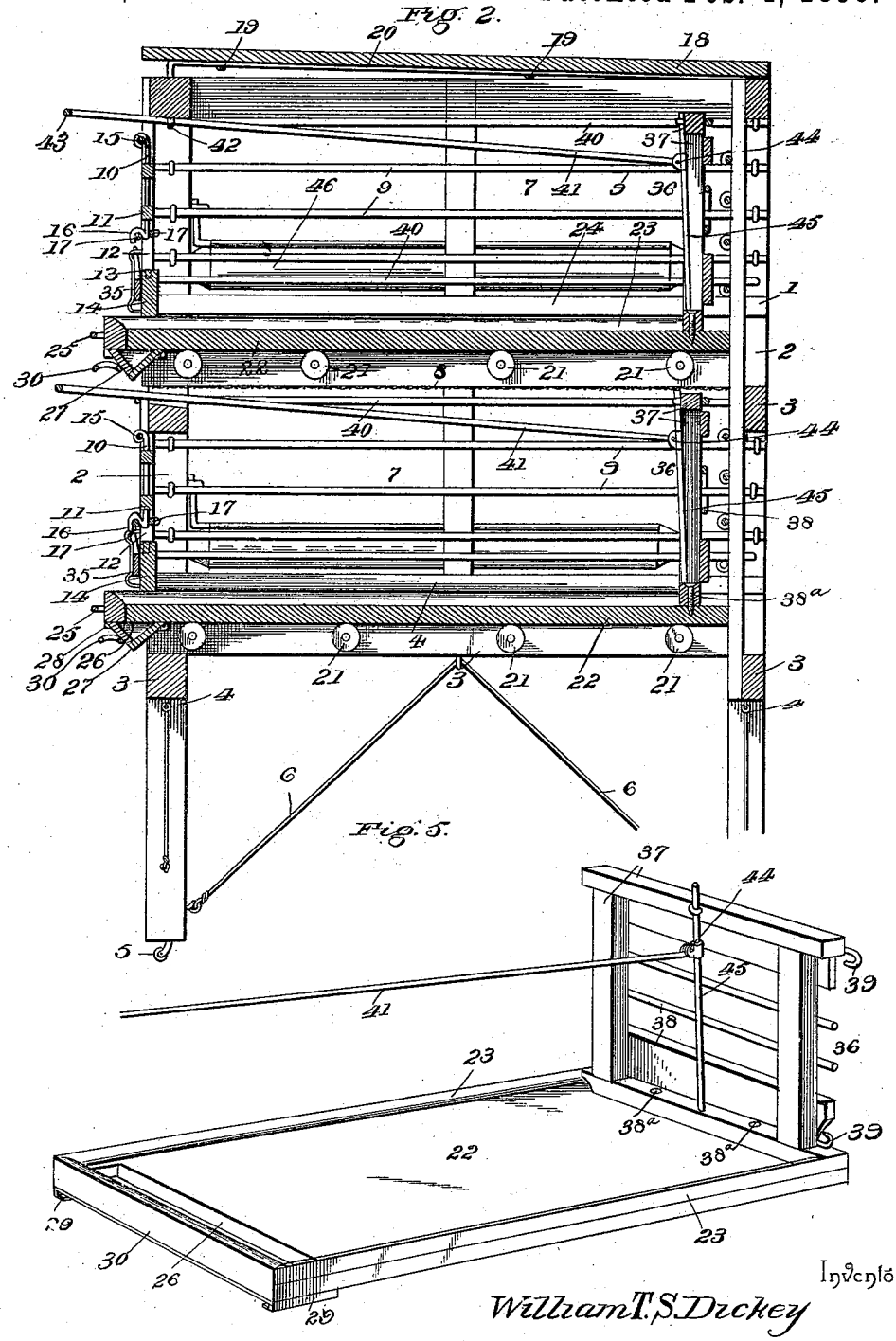
Witnesses
Inventor
William T. S. Dickey
By his Attorneys,

UNITED STATES PATENT OFFICE.

WILLIAM T. S. DICKEY, OF MINERAL BLUFF, GEORGIA.

POULTRY-COOP.

SPECIFICATION forming part of Letters Patent No. 553,902, dated February 4, 1896.

Application filed November 15, 1894. Serial No. 528,909. (No model.)

*To all whom it may concern:*

Be it known that I, WILLIAM T. S. DICKEY, a citizen of the United States, residing at Mineral Bluff, in the county of Fannin and State of Georgia, have invented a new and useful Poultry-Coop, of which the following is a specification.

This invention relates to poultry-coops; and it has for its object to provide a new and useful coop of this character especially adapted for the use of merchants dealing in chickens or other fowl, for use in henneries, private families, hotels, &c.

To this end the main and primary object of the present invention is to provide a coop of this character constructed with special reference for the easy handling of the fowl confined therein, as well as providing for the feeding and watering of the fowl and for the ready and thorough cleaning of the coop.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a poultry-coop constructed in accordance with this invention. Fig. 2 is a central vertical longitudinal sectional view thereof. Fig. 3 is a transverse vertical sectional view of the coop, showing the detachable upright end frames for the sliding bottom boards disconnected from the bottom boards for an independent sliding movement. Fig. 4 is a detail sectional view on the line $x\ x$ of Fig. 1. Fig. 5 is a detail in perspective of one of the sliding bottom boards with the detachable upright end frame attached thereto.

Referring to the accompanying drawings, 1 designates a coop-frame essentially comprising corner-uprights 2 connected by a series of horizontal side and end frame-bars 3, and the lower ends of said corner-uprights 2 are extended to form supporting-legs 4, preferably carrying the casters 5, and securely braced to the lower horizontal frame-bars by means of suitable inclined brace wires or rods 6, thereby completing the frame portion of a coop that can be easily moved from place to place. The interior space within the frame 1 is divided into two or more compartments 7 by means of a horizontal partition-netting 8, that serves to separate the compartments from each other to prevent the fowl in the lower compartment from flying up into the upper compartment when the bottom of said upper compartment is uncovered in the manner to be presently described, while at the same time the said netting allows for a free circulation of air throughout the entire frame of the coop.

The sides, ends, and top of the coop-frame 1 are provided with a parallel series of frame wires or bars 9, that are arranged sufficiently close together to provide for securely confining the fowl, while at the same time not interfering with an easy inspection of the contents of the coop and a free air-circulation, and at one end of each compartment of the coop the frame-wires are interrupted to form end door-openings 10, that are adapted to be covered and uncovered by the hinged wire doors 11.

The wire doors 11 are arranged to work between opposite door-posts 12, located at opposite sides of the openings and tenoned at their lower ends, as at 13, in the top of a removable end frame-bar 14, that is removably fitted to one end of the coop-frame at one end of each compartment to provide for supporting the door-posts and also for closing up the space directly over the bottoms for each compartment of the coop, as will be readily seen. The said wire doors 11 are provided at their upper edges with the hinge-eyes 15, loosely embracing one of the frame-wires 9, forming the top of the door-openings 10, and at their swinging edges the said wire doors are provided with the L-shaped wire catches 16, that are adapted to be sprung into engagement with one of a pair of lower catch-wires 17 at the bottom of the door-openings 10, the other of said catch-wires 17 forming a stop for the wire catches 16 to prevent the same from being moved inward within the coop by accident or otherwise.

Ordinarily the wire top for the coop is sufficient for confining the fowl and protecting the same; but, if found necessary, a removable imperforate cover or lid 18 may be employed. The cover or lid 18 may be made of sheet metal, wood, or other suitable material, and is of a size sufficient to entirely cover the top of the coop, and said cover or lid 18 is provided upon its under side with opposite pairs of headed studs 19, that are adapted to embrace or have a sliding engagement with the opposite securing rods or wires 20, that are secured on top of the coop-frame at opposite sides thereof. The opposite securing rods or wires 20 are raised slightly above the coop-frame and decline toward one end of the coop-frame, thereby providing an arrangement so that when the cover or lid is slid in position the same will be caused to bind slightly on top of the coop-frame, whereby the same will be firmly retained in place until it is desired to slide the same from off the top of the coop, as will be readily understood.

A series of supporting-rollers 21 are arranged along opposite bottom sides of each compartment of the coop, and said supporting-rollers support thereon within each compartment the sliding bottom boards or floors 22. The sliding bottom boards or floors 22 are imperforate, so as to support the fowl as well as provide for holding the manure, and said bottom boards or floors 22 are surrounded at their side and end upper edges by the beveled retaining-beads 23, that prevent the manure from working off the sides and ends of the bottom boards, and the side beads 23 at the side edges of said bottom boards or floors work under the opposite horizontal guide-rails 24, arranged at opposite inner sides of the coop-frame within each compartment above the supporting-rollers 21, to guide the sliding bottom boards or floors as the same are moved in or out in handling the fowl. The said sliding bottom boards or floors 22 are provided at their outer front ends with the handles 25, whereby the same may be readily moved in or out, and at their front ends the said bottom boards or floors are also provided with the transverse manure-slots 26, beneath which are adapted to be removably arranged the manure boxes or troughs 27.

The manure boxes or troughs 27 are preferably of a V shape in cross-section and are provided at their opposite ends with the slide-flanges 28, that are adapted to engage with the grooved cleats 29, attached to the under side of the bottom boards 22 at the ends of the slots 26. The said boxes or troughs 27 are provided at their front sides with the finger-handles 30, that provide convenient means for sliding the boxes or troughs in and out of position when emptying the same.

The bottom boards or floors 22 are arranged to slide under the end frame-bars 14 below the door-openings of each compartment, and pivotally connected at one end, as at 31, to the said end frame-bars 14 are the pivoted scraper-bars 32. The pivoted scraper-bars 32 are provided with lower beveled edges, 33, adapted to be adjusted down onto the bottom boards or floors 22 between the side beads thereof, and the said scraper-bars 32 are provided at their free ends with the handle portions 34, that work within wire keepers 35, arranged on one end of the coop-frame. The said keepers serve to hold the scraper-bars 32 either in an elevated or depressed position, and when the said bars are depressed it is simply necesssry to slide the bottom boards or floors 22 within the coop-frame to provide for scraping the manure up to the slots 26 and into the boxes or troughs 27, as will be readily seen. When not in use, the scraper-bars 32 are elevated to the position shown in Fig. 1 of the drawings.

The sliding bottom boards or floors 22 are adapted to carry at their inner ends the upright end frames 36. The upright end frames 36 are of a size adapted to register within the compartments of the coop and essentially consist of rectangularly-arranged frame-bars 37 and a series of wires or slats 38. The said frames 36 are preferably detachably fastened to the inner ends of the bottom boards or floors 22 by means of screws or other suitable fasteners 38ª, and the said frames are provided at their upper and lower corners with slide-hooks 39, that are adapted to be detachably engaged over the opposite pairs of guide rods or bars 40, that are arranged longitudinally within the compartments of the coop at the corners thereof. Ordinarily the upright end frames 36 are attached to the bottom boards or floors 22, so that when said boards or floors are drawn out the fowl will be necessarily carried up to the doors of the coop where they may be conveniently handled.

When it may be found desirable to provide for adjusting the end frames 36 without drawing out the bottom boards or floors 22, the said end frames 36 may be detached or disconnected from the bottom boards or floors, and the hooks 39 engaged on the wires 40, which guide the frames 36 for an independent sliding movement within the compartments above the bottom boards or floors 22. In order to provide for the adjustment of the frames 36, an adjusting-bar 41 is arranged to slide through a guide 42 at the door end of the coop and is provided at its outer end with a handle 43 for manipulating the same. The said adjusting-bars 41 for the said frames 36 are pivotally connected at their inner ends, as at 44, to the upright connecting-rods 45, that are secured to one side of the frames 36. The upright connecting-rods 45 are preferably detachably connected to the frames 36, so that when the said frames are carried by the bottoms or floors the adjusting connections for the frames may be removed; but it will be obvious that with the frames 36 supported for an independent sliding movement it is simply necessary to manipulate the bars 41 to provide for moving the fowl up to the doors of the coop.

Adjustably supported at opposite sides of the coop-frame at the sides of each compartment are the opposite semicircular water and feed troughs 46. The troughs 46 are provided at their opposite ends with the journals 47, mounted in suitable bearings 48 at the sides of the coop-frame, and at one end the said troughs 46 have connected thereto the offstanding catch-wires 49, adapted to be detachably sprung into engagement with the catch projections 50 on one of the corner-uprights 2 of the frame to provide for holding the said troughs in their upright positions, while at the same time allowing the same to be readily turned and tilted for cleaning. Both of the troughs 46 are provided at their outer edges with the longitudinal flanges 51 to retain the water and feed therein, and the feed-troughs are preferably provided at their inner edges with the inner declining guard-flanges 52, that prevent the food from being scattered outside of the coop when the fowls are feeding.

While only two compartments and their appurtenances have been described as completing the coop it will of course be understood that any number of compartments may be comprised within a single frame, and other changes in the form, proportion and the minor details of construction may be resorted to without departing from the principle or sacrificing any of the advantages of this invention, and at this point it may be noted that the coop is so constructed as to be capable of being readily knocked down and arranged in convenient shape for shipping.

Having thus described the invention, what is claimed, and desired to be secured by Letters Patent, is—

1. In a poultry-coop, the coop-frame provided at one end with a door-opening and with a guide, a movable bottom board or floor supported to slide longitudinally within the frame, an upright end frame arranged inside of the coop-frame and having a detachable connection with the upper side of the bottom board or floor at the inner end thereof, means for slidably supporting the upright end frame independently above and out of contact with the bottom board or floor, and an adjusting-bar slidably fitted in said guide and having a pivotal connection at its inner end with said upright end frame, whereby the said adjusting-bar can move the bottom board or floor and upright end frame together or the latter independently of the bottom board or floor, substantially as set forth.

2. In a poultry-coop, the coop-frame carrying opposite sets of supporting-rollers, a sliding bottom board or floor supported to work within the coop-frame on said rollers and provided at one end with a removable manure box or trough, an upright end frame detachably mounted on the end of said bottom board or floor opposite the manure-box, and a suitably-arranged scraper, substantially as set forth.

3. In a poultry-coop, the combination of the frame a movable bottom board or floor mounted to slide within said frame and provided at one end with a transverse manure-slot, a manure box or trough supported to slide on the bottom board or floor under the manure-slot thereof, and a scraper-bar pivotally supported at one end of the coop-frame and arranged for adjustment over and onto said bottom board or floor, substantially as set forth.

4. In a poultry-coop, the coop-frame provided with a door-opening at one end and with opposite pairs of guide rods or bars arranged longitudinally within the same at the corners thereof, a movable bottom board or floor mounted to slide within the frame, an upright end frame detachably mounted on the inner end of said bottom board or floor and provided at its corners with slide-hooks adapted to detachably engage said guide rods or bars to provide for independently and slidably supporting the end frame above and out of contact with the bottom board or floor, and an adjusting-bar guided to work beyond one end of the coop-frame and connected at its inner end to said upright end frame, substantially as set forth.

In testimony that I claim the foregoing as my own I have hereto affixed my signature in the presence of two witnesses.

WILLIAM T. S. DICKEY.

Witnesses:
THOMAS M. GREENWOOD,
WILLIAM A. WILSON.